(12) United States Patent
Towers et al.

(10) Patent No.: US 8,135,694 B2
(45) Date of Patent: Mar. 13, 2012

(54) AUGMENTING THE CONTENTS OF AN ELECTRONIC DOCUMENT WITH DATA RETRIEVED FROM A SEARCH

(75) Inventors: Simon John Towers, San Jose, CA (US); James Cornelius King, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 173 days.

(21) Appl. No.: 11/374,270

(22) Filed: Mar. 13, 2006

(65) Prior Publication Data

US 2007/0214112 A1 Sep. 13, 2007

(51) Int. Cl.
*G06F 7/00* (2006.01)
(52) U.S. Cl. ...................................................... 707/706
(58) Field of Classification Search ............... 707/6, 706
See application file for complete search history.

(56) References Cited

U.S. PATENT DOCUMENTS

| | | | |
|---|---|---|---|
| 3,599,643 A | | 8/1971 | Schwartz |
| 4,271,580 A | | 6/1981 | King et al. |
| 4,903,349 A | | 2/1990 | Arai |
| 5,222,236 A | * | 6/1993 | Potash et al. ................... 707/102 |
| 5,469,582 A | | 11/1995 | Livingston |
| 5,479,662 A | | 1/1996 | Runco |
| 5,652,958 A | | 8/1997 | Farrell-Mestas |
| 5,754,840 A | * | 5/1998 | Rivette et al. ...................... 707/2 |
| 5,848,410 A | * | 12/1998 | Walls et al. ........................ 707/4 |
| 5,893,171 A | | 4/1999 | Ries |
| 5,956,762 A | | 9/1999 | Adams |
| 6,321,228 B1 | * | 11/2001 | Crandall et al. ................. 707/10 |
| 7,310,687 B2 | * | 12/2007 | Psounis et al. ................. 709/247 |
| 2001/0032204 A1 | * | 10/2001 | Hoashi et al. ...................... 707/5 |
| 2002/0055945 A1 | * | 5/2002 | Endress et al. ................ 707/500 |
| 2002/0124055 A1 | * | 9/2002 | Reisman ........................ 709/218 |
| 2003/0217061 A1 | * | 11/2003 | Agassi et al. .................... 707/10 |
| 2005/0080804 A1 | * | 4/2005 | Bradshaw et al. ............. 707/102 |
| 2005/0193335 A1 | * | 9/2005 | Dorai et al. .................... 715/530 |
| 2006/0218114 A1 | * | 9/2006 | Weare et al. ...................... 707/1 |

FOREIGN PATENT DOCUMENTS

EP 0 703 537 3/1996

OTHER PUBLICATIONS

International Search Report for PCT/US2007/005911, mailed Mar. 13, 2008.
Popyack, J., et al., "Mail Merge as a First Programming Language," SIGCSE Bulletin, ACM, New York, NY, vol. 25., No. 1, Mar. 1993, pp. 136-140, XP002359875.
European Office Action from Application No. 07 752 599.6-2201, dated May 26, 2011, 6 pages, Adobe Systems Incorporated.

* cited by examiner

*Primary Examiner* — Jensen Hu
(74) *Attorney, Agent, or Firm* — Robert C. Kowert; Meyertons, Hood, Kivlin, Kowert & Goetzel, P.C.

(57) ABSTRACT

The augmentation of contents of an electronic document with data from a search is described. The augmentation of data includes reading a search criterion from an electronic document, where a portion of the electronic document is comprised of the search criterion, retrieving data that matches the search criterion, and augmenting the contents with the retrieved data.

25 Claims, 11 Drawing Sheets

AUGMENTING THE CONTENTS OF AN ELECTRONIC DOCUMENT WITH DATA RETRIEVED FROM A SEARCH

FIELD OF THE INVENTION

The present invention relates generally to software and, more particularly, to methods and systems for incorporating data into an electronic document.

BACKGROUND

Currently, the contents that comprise an electronic document are manually inputted into the electronic document, and the electronic document has limited capability to incorporate external contents stored outside the electronic document. For example, mail merge is a typical feature found in many word processing applications that may be used to create electronic documents such as mailing labels and letters. In particular, mail merge can be used to produce multiple documents from a single template and information stored externally in a structured data source. To add information associated with the structured data source in a mail merge, fields that correspond to the names of columns and/or rows associated with the structured data source are placed in the electronic document. The columns and rows of the structured data source contain the requested information. When mail merge is executed, the word processing application basically creates an output document by substituting the column and/or row names in the electronic document with values from the matching columns and/or rows of the structured data source.

In another example, data merge is another typical feature found in electronic documents associated with variable data printing. Variable data printing is a type of printing where electronic documents (e.g., bills, catalogues, and mass mailings) are created from a combination of a single template and variable information stored in a structured data source. Similar to mail merge, to add information associated with the structured data source, fields that are placed in the electronic document are substituted with values from the matching fields of the structured data source.

The simple substitution of values into the electronic document limits the incorporation of external content into the electronic document. For example, the electronic document can only incorporate data from one specified structured data source. Furthermore, the information incorporated into the electronic document cannot be refreshed or reloaded until the user manually runs the mail or data merge functionality. Accordingly, the incorporated information displayed on the electronic document may not be current. Another limitation of mail or data merge is that the substituted values and layout of the electronic document are static. In other words, the content and layout of the electronic document are fixed. For example, the incorporated information and presentation of the electronic document can not be customized to an individual's preferences.

In view of the foregoing, there is a need to further improve the incorporation of data into an electronic document.

BRIEF DESCRIPTION OF THE DRAWINGS

Various embodiments of the invention are disclosed in the following detailed description and the accompanying drawings.

DETAILED DESCRIPTION

Various embodiments of the invention may be implemented in numerous ways, including as a system, a process, an apparatus, or a series of program or computer instructions on a computer readable medium such as a computer readable storage medium or a computer network where the program instructions are sent over optical or electronic communication links. In general, the operations of disclosed processes may be performed in an arbitrary order, unless otherwise provided in the claims.

A detailed description of one or more examples is provided below along with accompanying figures. The detailed description is provided in connection with such examples, but is not limited to any particular embodiment. The scope is limited only by the claims and numerous alternatives, modifications, and equivalents are encompassed. Numerous specific details are set forth in the following description in order to provide a thorough understanding. These details are provided for the purpose of example and the described embodiments may be implemented according to the claims without some or all of these specific details. For the purpose of clarity, technical material that is known in the technical fields related to the embodiments has not been described in detail to avoid unnecessarily obscuring the description.

The embodiments described herein provide methods and systems for augmenting the contents of an electronic document with data retrieved from a search. In general, search criteria stored in an electronic document may be used to retrieve data from external sources (i.e., sources outside the electronic document). As explained in more detail below, in an embodiment, an electronic document processing application may retrieve the data that matches the search criteria by searching for the data on external sources. The content of the electronic document thereafter is augmented with the retrieved data.

Figure 1A:
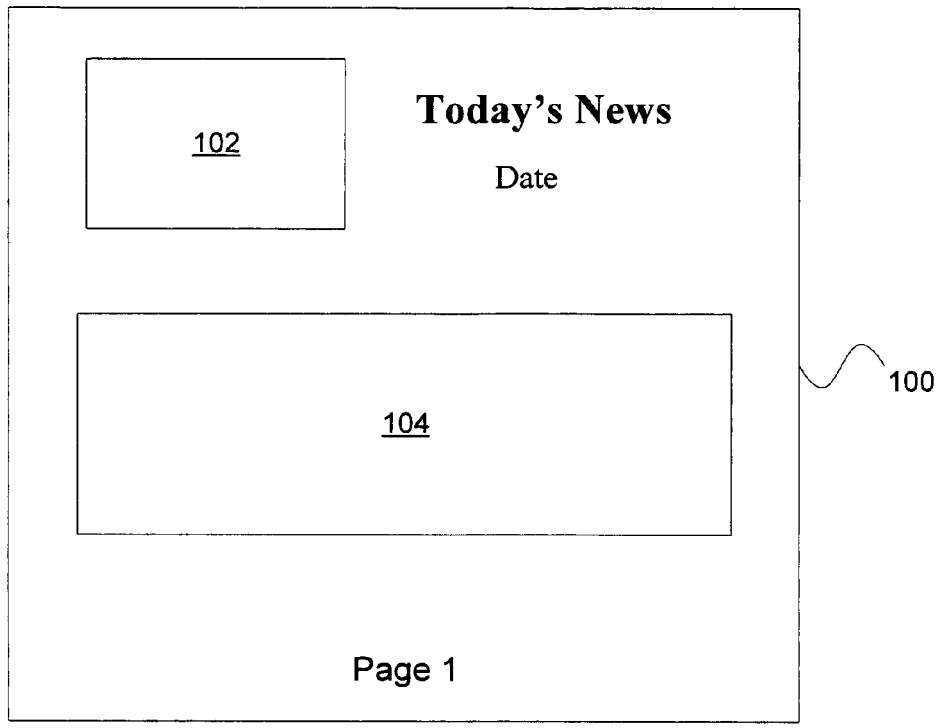
FIGS. 1A and 1B are diagrams of exemplary rendered electronic documents that can retrieve data matching one or more search criteria, in accordance with various embodiments.
Figure 1B:
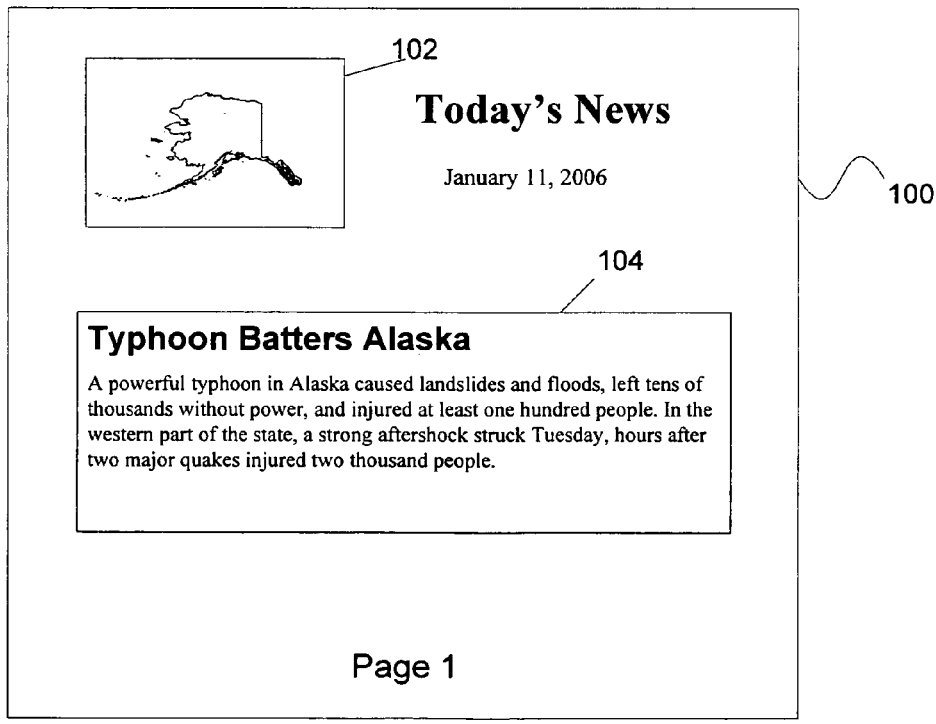

FIGS. 1A and 1B are diagrams of exemplary rendered electronic documents that can retrieve data matching one or more search criteria, in accordance with various embodiments. Electronic document 100 of FIG. 1A includes regions 102 and 104 that are configured to display data that match one or more search criteria. It should be appreciated that electronic document 100 is a document existing in electronic form that is accessible by computer technology. For example, electronic document 100 can be a file that is not an executable file and includes data for use by a computer program. Exemplary electronic document 100 can include a single or multiple files that are accessible by and/or associated with electronic document processing applications such as word processing applications, document viewers, email applications, presentation applications, spreadsheet applications, diagramming applications, graphic editors, graphic viewers, enterprise applications, and other applications. Therefore, contents of electronic document 100 may be composed of alphanumeric text, symbols, images, videos, sounds, formatting information, and other data. The file associated with electronic document 100 can be designed for portability. As a result, in an embodiment, a single file associated with electronic document 100 may encapsulate a complete description of the electronic document. In another embodiment, multiple files associated with electronic document 100 can encapsulate the description of the electronic document.

Electronic document 100 may have a variety of file formats, and the file formats may be identified by data within the electronic document and/or by the filename extension. Exemplary file formats that can be associated with electronic document 100 include Adobe® Portable Document Format (PDF), Microsoft DOC format, Hypertext Markup Language (HTML) format, Extensible Markup Language (XML) format, Microsoft XLS format, Tag Image File Format (TIFF), and other file formats that can be associated with the electronic document.

Furthermore, electronic document 100 or one or more files associated with the electronic document can be configured to store one or more search criteria. In other words, the search criteria may be embedded with other contents of electronic document 100 and therefore, a portion of the contents may be comprised of one or more search criteria. As explained in more detail below, the search criteria are configured for input into an electronic document processing application that is configured to retrieve data that matches the search criteria. A search criterion (or search query) is not a link. Instead, a search criterion may include many alphanumeric characters and symbols that may be searched. For example, search criteria can include text, keywords, query languages, sentences, numbers, phrases, questions, equations, and other suitable search criteria. As used herein, it should be noted that the terms "search criterion" and "search query" may be used interchangeably.

As shown in FIG. 1A, electronic document 100 as rendered includes regions 102 and 104 that are configured to display data that match one or more search criteria. The search criteria are stored in one or more files associated with electronic document 100 and the search criteria can be read when the electronic document is opened or accessed. After the search criteria are read, as shown in FIG. 1B, data that match the search criteria are retrieved and rendered in regions 102 and 104. It should be noted that the process of rendering converts the contents of an electronic document (e.g., videos, audio, alphanumeric text, and other contents) for output to an output device that presents the contents from a computing device to a user. Exemplary output devices include speakers, video displays, printers, and other output devices. In the exemplary rendered electronic document 100 shown in FIG. 1B, an image that matches the search criteria is retrieved and rendered in region 102. Additionally, text that match the search criteria are retrieved and rendered in region 104. Electronic document 100 may include a variety of other contents. For example, in addition to the text and images of FIG. 1B, sounds may be retrieved and rendered on an audio speaker when electronic document 100 is opened.

Figure 2:
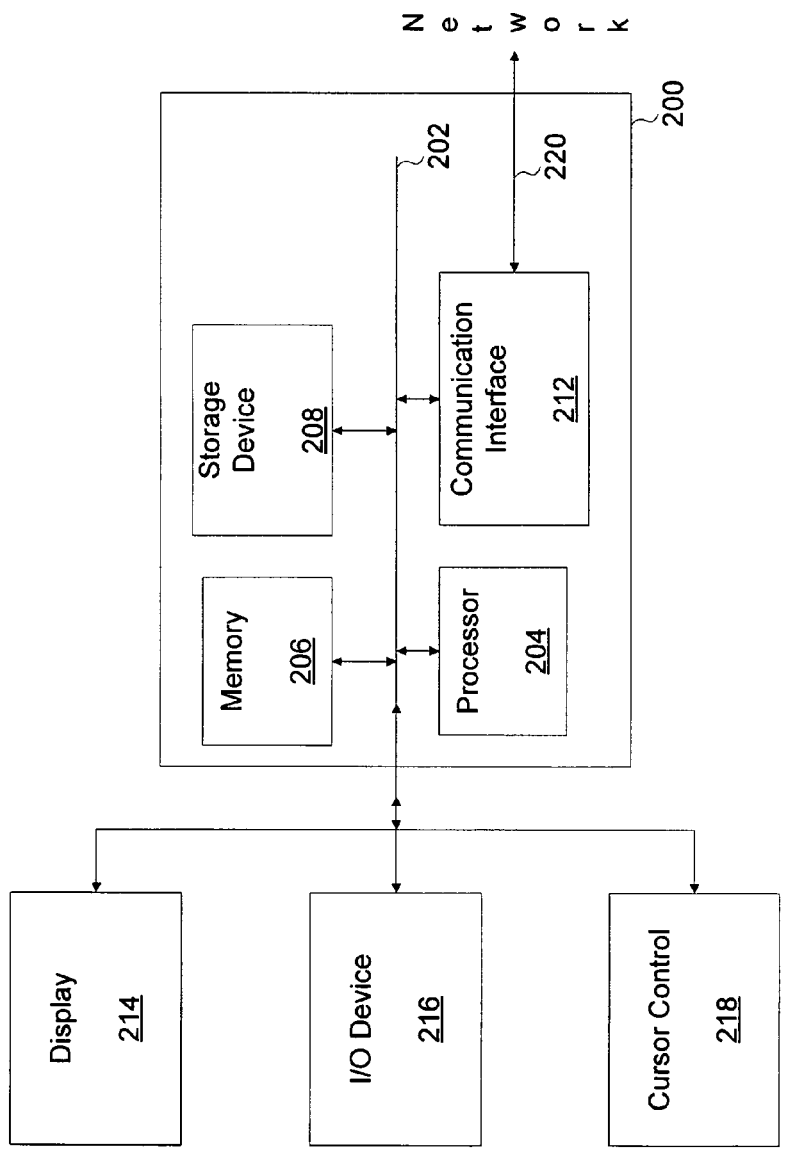
FIG. 2 is a simplified block diagram of an exemplary computer system suitable for processing an electronic document, in accordance with an embodiment

FIG. 2 is a simplified block diagram of an exemplary computer system suitable for processing an electronic document, in accordance with an embodiment. In some embodiments, computer system 200 may be used to implement computer programs, logic, applications, methods, processes, or other software to process an electronic document. Exemplary computer system 200 includes a desktop computer, a server, a portable computing device, a personal digital assistant, a computational engine within an appliance, and other computer systems. As shown in FIG. 2, computer system 200 includes bus 202 or other communication mechanism for communicating information, which interconnects subsystems and devices, such as processor 204, system memory 206 (e.g., random access memory (RAM)), storage device 208 (e.g., read only memory (ROM), magnetic disk drives, optical disk drives, and other storage devices), communication interface 212 (e.g., modem or Ethernet card), display 214 (e.g., cathode ray tube (CRT) or liquid crystal display (LCD)), input/output device 216 (e.g., keyboard), and cursor control 218 (e.g., mouse or trackball).

In some embodiments, computer system 200 performs specific operations by processor 204 when executing one or more sequences of one or more program instructions stored in system memory 206. Such program instructions may be read into system memory 206 from another computer readable medium, such as storage device 208. In some embodiments, hard-wired circuitry may be used in place of or in combination with software program instructions to implement embodiments of the invention.

It should be appreciated that the term "computer readable medium" refers to suitable medium that participates in providing program instructions to processor 204 for execution. Such a medium may take many forms, including but not limited to, non-volatile media, volatile media, and transmission media. Non-volatile media may include, for example, optical or magnetic disks, such as storage device 208. Volatile media may include dynamic memory, such as system memory 206. Transmission media includes coaxial cables, copper wire, and fiber optics, including wires that comprise bus 202. Transmission media can also take the form of acoustic or light waves, such as those generated during radio wave and infrared data communications. Common forms of computer readable media includes, for example, magnetic mediums (e.g., floppy disk, flexible disk, hard disk, magnetic tape, and other magnetic mediums), optical mediums (e.g., compact disc read-only memory (CD-ROM) and other optical mediums), physical medium with patterns (e.g., punch cards, paper tape, any other physical mediums), memory chips or cartridges, carrier waves, (e.g., RAM, programmable read-only memory (PROM), erasable programmable read-only memory (EPROM), flash memory, and other memory chips or cartridges), and any other medium from which a computer can read.

In some embodiments, execution of the sequences of program instructions to practice the embodiments may be performed by a single computer system 200. In other embodiments, two or more computer systems, such as computer system 200, coupled by communication link 220 (e.g., local area network (LAN), public switched telephone network (PSTN), wireless network, and other communication links) may perform the sequence of program instructions to practice the embodiments in coordination with one another. In addition, computer system 200 may transmit and receive messages, data, and instructions, including program, i.e., application code, through communication link 220 and communication interface 212. Received program instructions may be executed by processor 204 as the program instructions are received, and/or stored in storage device 208, or other non-volatile storage for later execution.

Figure 3:
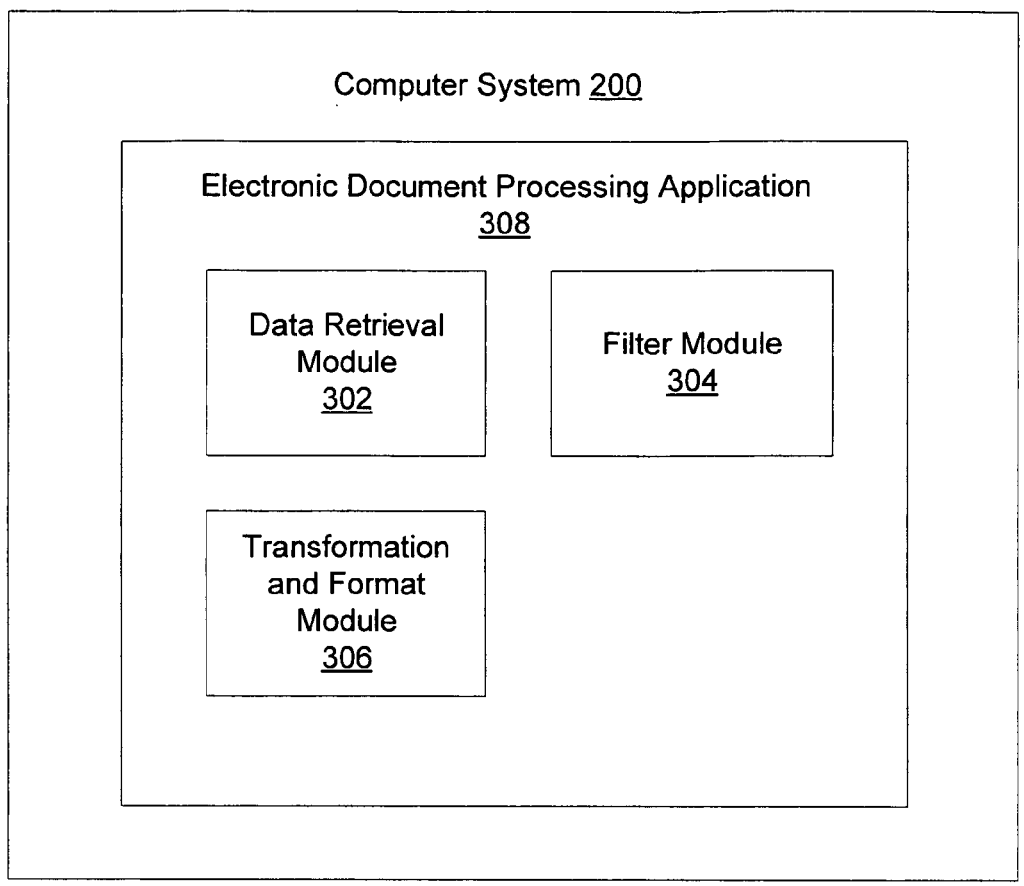
FIG. 3 is a simplified block diagram of an exemplary system for processing an electronic document, in accordance with an embodiment.

FIG. 3 is a simplified block diagram of an exemplary system for processing an electronic document, in accordance with an embodiment. As shown in FIG. 3, electronic document processing application 308 may be hosted on computer system 200. In the embodiment of FIG. 3, electronic document processing application 308 includes data retrieval module 302, filter module 304, and transformation and format module 306. It should be appreciated that in other embodiments, electronic document processing application 308 may include fewer or more modules apart from those shown in FIG. 3. For example, in another embodiment, electronic document processing application 308 includes data retrieval module 302 and transformation and format module 306, but not filter module 304.

Data retrieval module 302 is configured to read search criteria from an electronic document (or one or more files associated with an electronic document) and retrieve data that matches the search criteria. As explained in more detail below, in an embodiment, data retrieval module 302 may retrieve data by searching for and fetching the data that matches the search criteria. In another embodiment, data retrieval module 302 may retrieve data by communicating the search criteria to a search application that is configured to search for the data that matches the search criteria.

After data retrieval module 302 retrieves data that matches the search criteria, filter module 304 may filter the data based on one or more filtering criteria that may be stored in the electronic document. After filter module 304 filters the data, in an embodiment, transformation and format module 306 transforms and/or formats the data that matches the search criteria for output.

Figure 4:
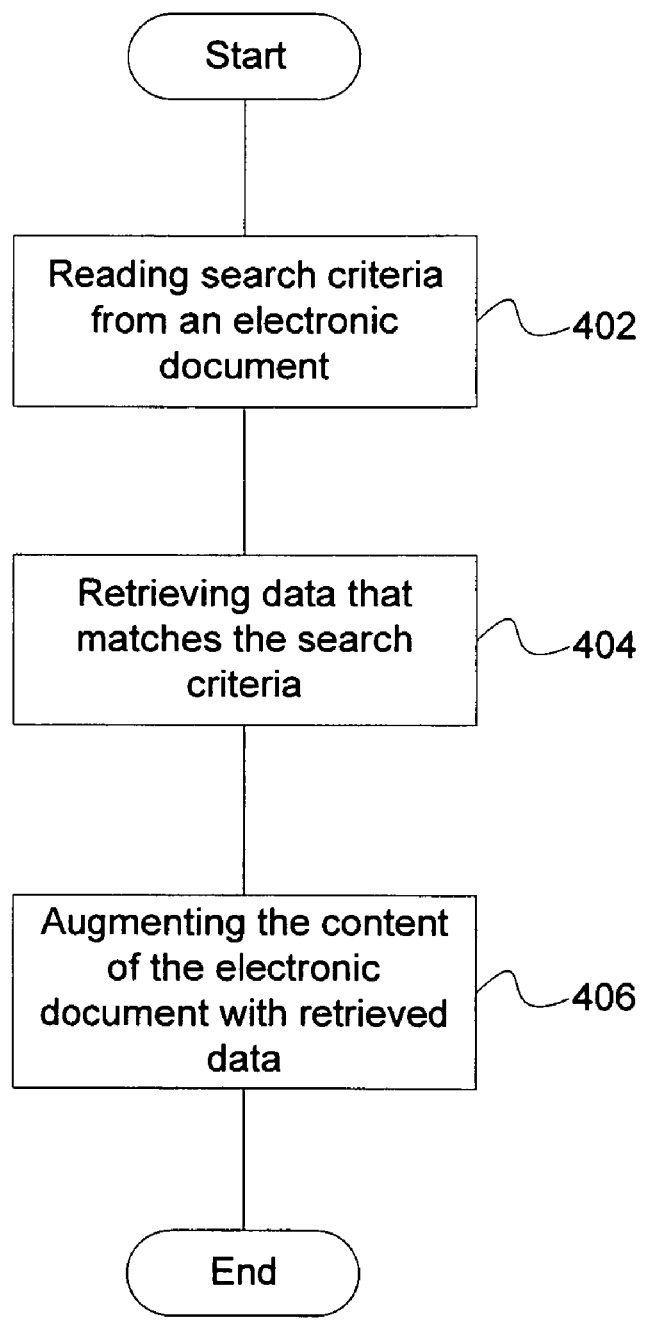
FIG. 4 is a flowchart diagram of a high level overview of an exemplary method for processing an electronic document, in accordance with an embodiment.

FIG. 4 is a flowchart diagram of a high level overview of an exemplary method for processing an electronic document, in accordance with an embodiment of the present invention. One or more search criteria can be stored in an electronic document and, as shown in FIG. 4, the search criteria is read from the electronic document in operation 402. In other words, one or more search criteria can be stored in one or more files associated with an electronic document and, operation 402 extracts or reads the search criteria from the one or more files associated with the electronic document. As used herein, it should be noted that the terms "read" and "extract" in the context of reading or extracting information from the electronic document may be used interchangeably.

After the search criteria is read or extracted, the data that matches the search criteria is retrieved in operation 404. As explained in more detail below, in an embodiment, the electronic document processing application may search for and fetch the data that matches the search criteria. In another embodiment, the electronic document processing application can communicate the search criteria to a search application that is configured to search for the data that matches the search criteria.

After the search application finds the data, the electronic document processing application receives the data from the search application and, in operation 406, augments the contents of the electronic document with the retrieved data. The augmentation of the contents can include adding the retrieved data to the original contents of the electronic document. Thus, the contents of the electronic document rendered for output may include the original contents and the retrieved data. Augmentation of the contents may also include updating or replacing a portion of the original contents of the electronic document with the retrieved data.

Data Retrieval

Figure 5:
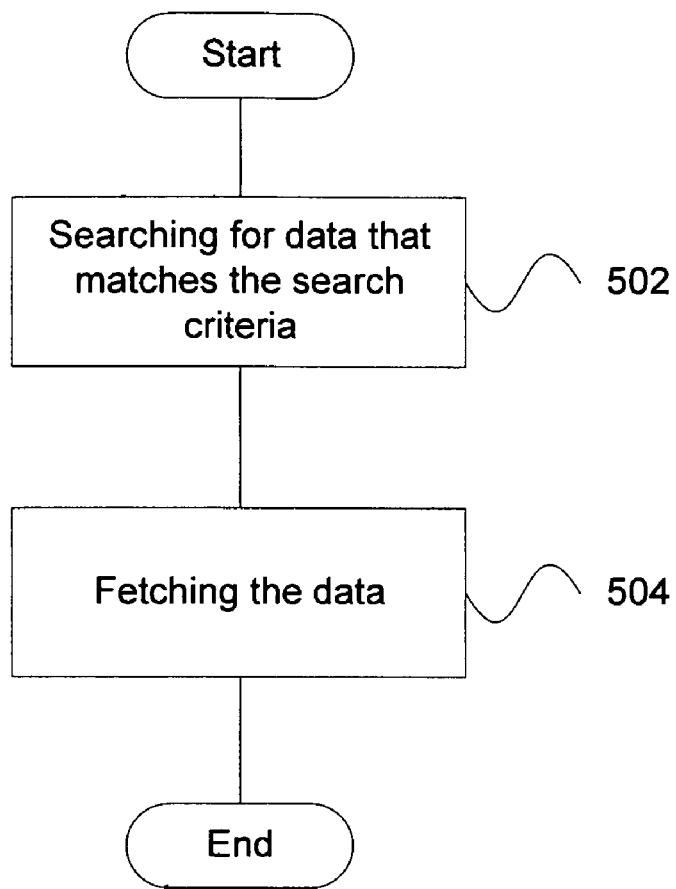
FIG. 5 is a flowchart diagram of an exemplary method for retrieving data that matches the search criteria, in accordance with an embodiment.

FIG. 5 is a flowchart diagram of an exemplary method for retrieving data that matches the search criteria, in accordance with an embodiment. After an electronic document processing application reads the search criteria from an electronic document, in the embodiment shown in FIG. 5, the electronic document processing application may search for data that matches the search criteria in operation 502. As explained in more detail below, the document processing application may search for the data on the computer system hosting the document processing application and other computer systems in communication with the document processing application. After the data that matches the search criteria is found, the data is fetched in operation 504.

Figure 6:
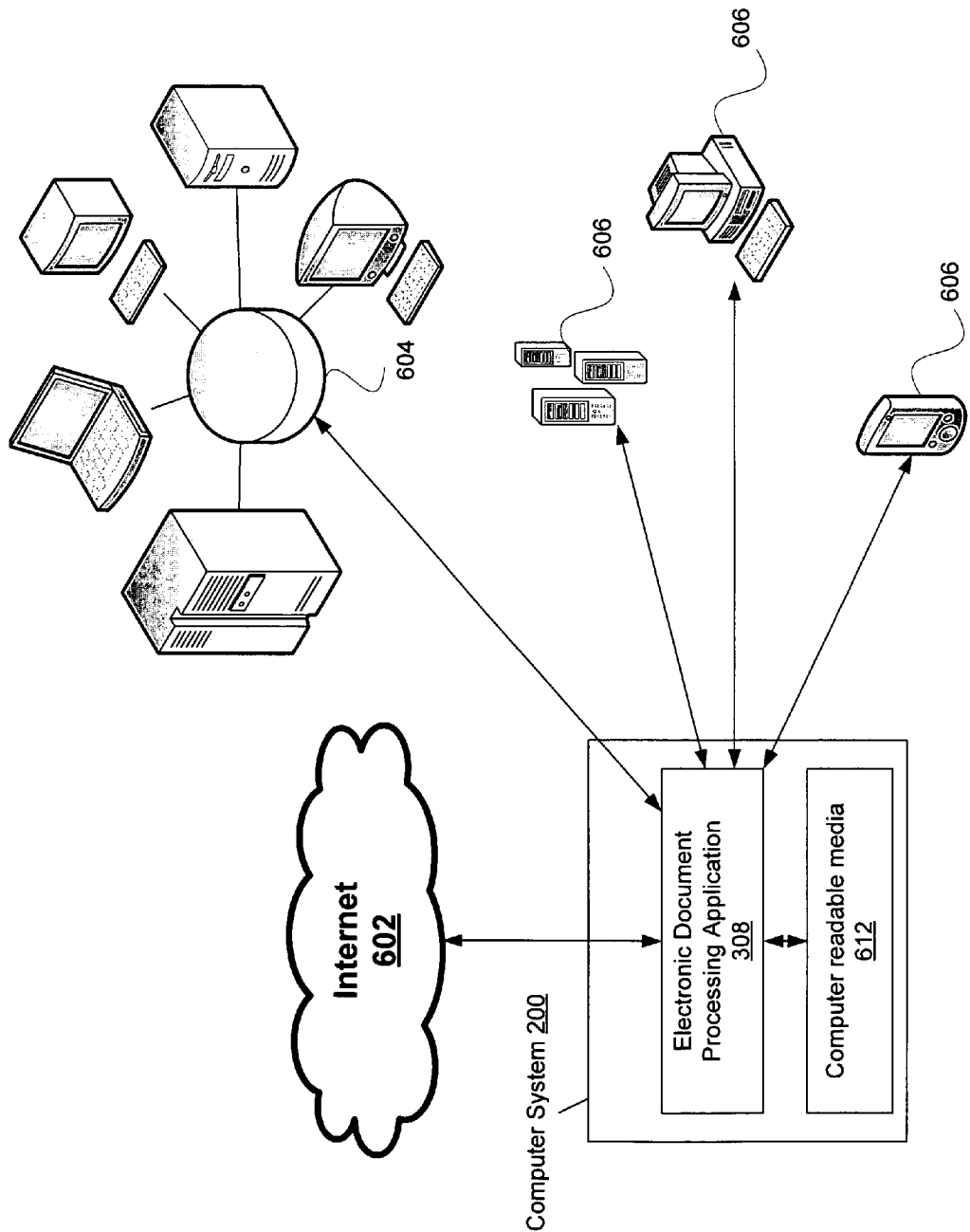
FIG. 6 is a simplified diagram of exemplary computer systems that may be searched by an electronic document processing application, in accordance with an embodiment.

FIG. 6 is a simplified diagram of exemplary computer systems that may be searched by an electronic document processing application, in accordance with an embodiment of the present invention. As shown in FIG. 6, computer system 200 is hosting electronic document processing application 308 and the electronic document processing application can be in communication with or access computer readable media 612 associated with computer system 200. As a result, electronic document processing application 308 can search for data that matches the search criteria stored on computer readable media 612 (e.g., magnetic disks, optical disks, memories, and other computer readable media) associated with computer system 200. Additionally, electronic document processing application 308 may be in communication with a computer network, which can include local area network (LAN) 604 and Internet 602, and in communication with computer systems 606 that are directly linked to computer system 200. Thus, electronic document processing application 308 may search for data that matches the search criteria stored on computer readable media associated with computer systems 606 in direct communication with computer system 200 and with computer systems associated with LAN 604 and Internet 602.

Electronic document processing application 308 may search for data from many data structures or collection of data stored on computer readable media, such as computer readable media 612. Exemplary collection of data that may be searched include databases, audio files, video files, and files associated with electronic documents (e.g., image files, spreadsheets, word processing documents, emails, and other electronic documents). Furthermore, electronic document processing application 308 can be in communication with Internet 602 and it should be appreciated that the Internet is a collection of interconnected computer networks that communicate using one or more protocols (e.g., Internet Protocol (IP)). In addition to the World Wide Web (Web) that uses Hypertext Transfer Protocol (HTTP), Internet 602 contains many other protocol sub-networks. Exemplary protocol sub-networks include email (e.g., Simple Mail Transfer Protocol (SMTP) and Post Office Protocol (POP)), Internet Relay Chat (IRC), Instant Messaging (IM), File Transfer Protocol (FTP), Network News Discussion Groups, and other protocol sub-networks. Accordingly, collection of data associated with Internet 602 also may be searched. In one exemplary embodiment, electronic document processing application 308 may search Web pages on Internet 602 for data that matches the search criteria. In another exemplary embodiment, electronic document processing application 308 can search on Internet 602 for messages transmitted between instant messaging services for data that matches the search criteria. In still another exemplary embodiment, electronic document processing application 308 can search Web feeds from Web sites (e.g., Really Simple Syndication (RSS) feeds) for data that matches the search criteria.

Electronic document processing application 308 can use many known search algorithms to search for data that matches the search criteria. The string searching algorithm is an exemplary search algorithm that searches for patterns within strings. Another exemplary search algorithm can use object segmentation and statistical modeling to search for images that match the search criteria. Other exemplary search algorithms include search algorithms that use heuristics to search a search space.

Still referring to FIG. 6, in an embodiment, after the data that matches the search criteria is found, electronic document processing application 308 may fetch the data from one or more sources, such as computer systems 606, computer systems associated with LAN 604, Internet 602, and computer system 200 hosting the electronic document processing application. In another embodiment, if the data is already cached in computer system 200 hosting electronic document processing application 308, the electronic document processing application may fetch the cached copy of data from the computer system hosting the electronic document processing application rather than refetching the data from the source.

In an embodiment, electronic document processing application 308 can retrieve data that matches the search criteria periodically. For example, the data can be retrieved or refreshed at regular intervals. In another embodiment, electronic document processing application 308 can retrieve the data automatically when the electronic document is opened. In still another embodiment, electronic document processing application 308 can automatically retrieve data when the electronic document is opened and also periodically. For example, when the electronic document is opened, the data may be automatically retrieved. Electronic document processing application 308 therefore retrieves and augments the contents of the electronic document with the most recent data that matches the search criteria when opened. After the electronic document is opened, the data may be updated at regular intervals. Electronic document processing application 308 can also retrieve data that matches the search criteria at the request of a user. In an exemplary embodiment, electronic document processing application 308 can retrieve data that matches the search criteria in response to a user input. Exemplary user inputs include clicking on a region of a graphical user interface (e.g., clicking on a refresh button), keyboard inputs, and other user inputs.

Figure 7:
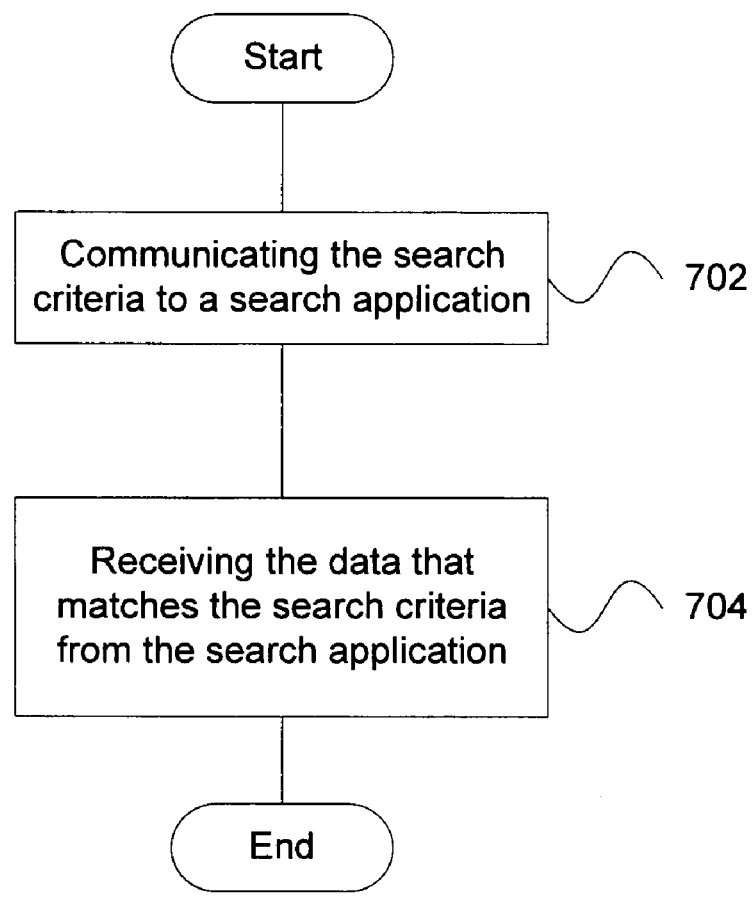
FIG. 7 is a flowchart diagram of another exemplary method for retrieving data that matches the search criteria, in accordance with another embodiment.

FIG. 7 is a flowchart diagram of another exemplary method for retrieving data that matches the search criteria, in accordance with another embodiment. In addition to searching for data that matches the search criteria itself, as shown in operation 702, the electronic document processing application may communicate the search criteria to a search application. As explained in more detail below, the search application is configured to search for data that matches the search criteria. After the data that matches the search criteria is found, the electronic document processing application receives the data in operation 704 from the search application.

Figure 8:
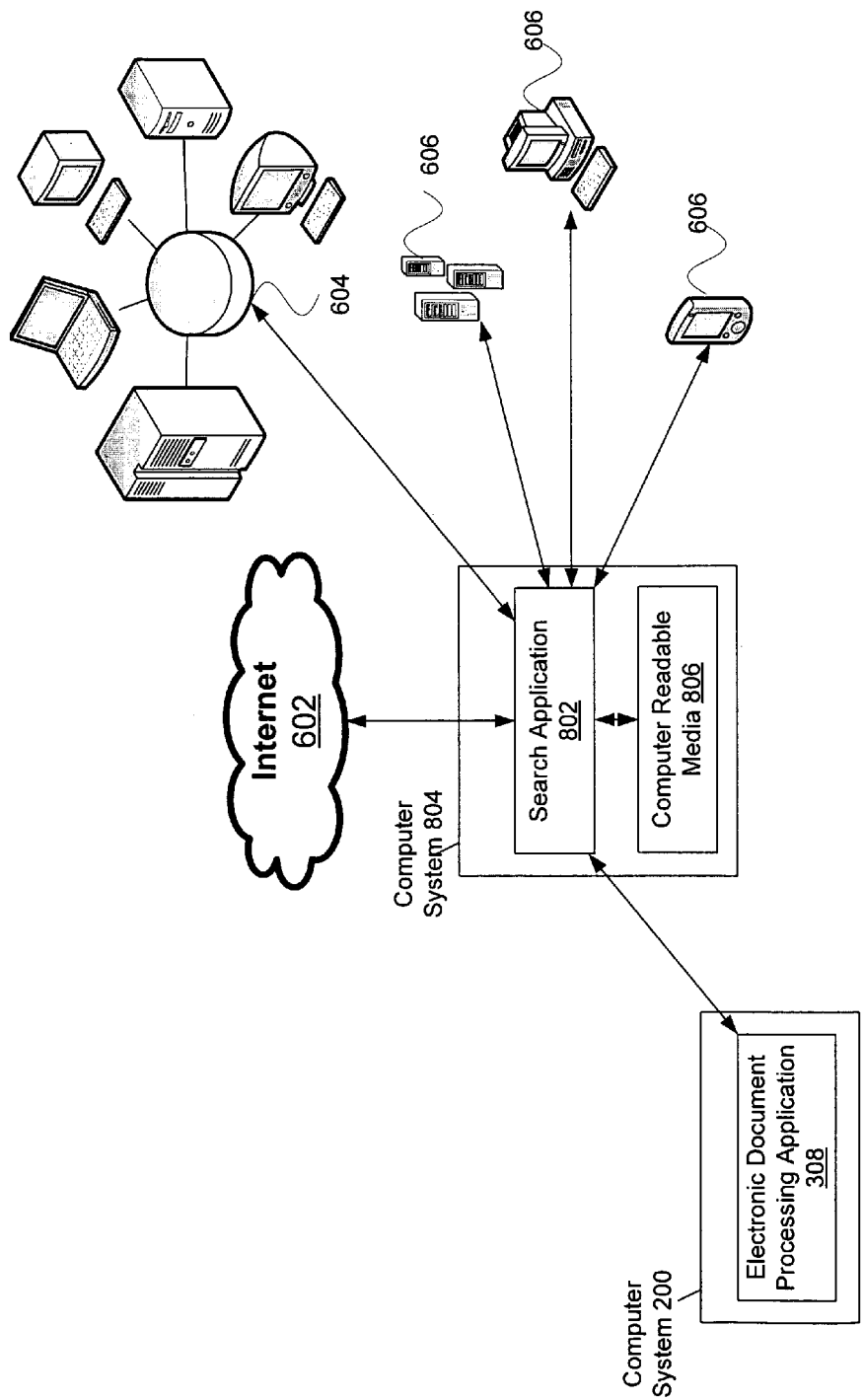
FIG. 8 is a simplified diagram of an electronic document processing application using a search application to search for data that matches the search criteria, in accordance with an embodiment.

FIG. 8 is a simplified diagram of an electronic document processing application accessing a search application to search for data that matches the search criteria, in accordance with an embodiment. As shown in FIG. 8, computer system 200 is hosting electronic document processing application 308 and the electronic document processing application is in communication with search application 802, which is hosted on computer system 804. Electronic document processing application 308 communicates search criteria to search application 802 and the search application is configured to search for the data that matches the search criteria.

Search application 802 may be in communication with a computer network, which can include LAN 604 and Internet 602, and in communication with computer systems 606 that are directly linked to computer system 804. As a result, search application 802 may search for data that matches the search criteria on the computer network and on computer systems 606. For example, to search a database, electronic document processing application 308 can communicate a search criterion in the form of a database query language (e.g., Structured Query Language (SQL)) to search application 802. Search application 802 may be a database management system that is configured to manage a database and run operations on the data requested by clients, such as electronic document processing application 308. Exemplary database management systems include Microsoft SQL Server, IBM DB2, Sybase SQL Server, and other database management systems. Search application 802 may search for data that matches the search criterion on databases stored on computer readable media 806 associated with computer system 804. Search application 802 may also search for data on databases stored in computer systems 606 and on LAN 604.

In an embodiment, electronic document processing application 308 can access the functions of search application 802 by communicating the search criteria to an application programming interface (API) associated with the search application. It should be appreciated that electronic document processing application 308 may communicate with APIs associated with a variety of search applications, such as search application 802, to access the search functionalities of the search application. For example, to search for data stored in Web pages on the Web, electronic document processing application 308 accesses search application 802 that is configured to search Internet 602 (e.g., Internet search engine). To access search application 802, electronic document processing application 308 can connect remotely to an API service associated with the search application. Communication can be performed using the Simple Object Access Protocol (SOAP), HTTP, or other communication protocols. The API service provides query access to search application 802, thereby allowing electronic document processing application 308 to search Web pages on Internet 602 and to receive data and/or links to data that matches the search criteria from the search application. For example, electronic document processing application 308 may communicate a search criterion in the form of a keyword, for example, to the API service associated with search application 802. Search application 802 searches through an index of compiled Web pages for data that matches the search criterion. Thereafter, search application 802 communicates one or more links to the Web pages that match the search criterion. Electronic document processing application 308 may then access the Web pages though the received links and fetch the data from the Web pages.

In another example, electronic document processing application 308 may search for product information on Internet 602 by accessing APIs associated with commerce services. For example, to access information associated with products (e.g., price, quantity, shipment information, product images, customer information, and other product information) on a commerce Web site, electronic document processing application 308 may communicate with search application 802 associated with the commerce Web site through an API. Here, search application 802 is configured to search for information associated with products on sale as listed on the commerce Web site. Search application 802 and API associated with the search application may be accessible through SOAP and other communication protocols. By communication with search application 802 through the API, electronic document processing application 308 can search for data from the product information stored on the commerce Web site.

Figure 9:
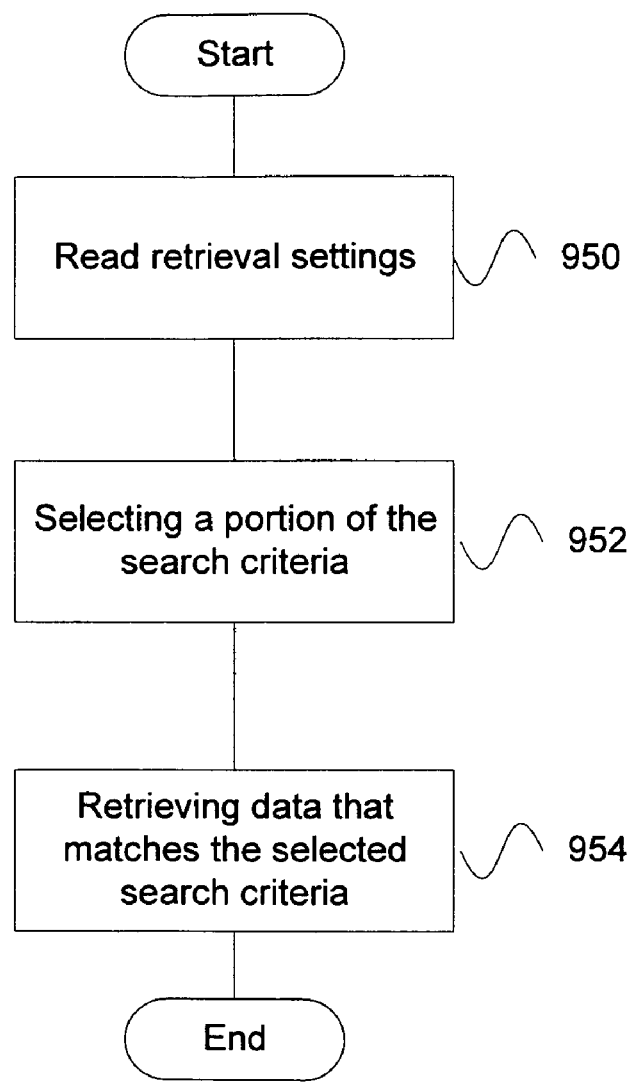
FIG. 9 is a flowchart diagram of an exemplary method for retrieving data based on customizable retrieval settings, in accordance with an embodiment.

FIG. 9 is a flowchart diagram of an exemplary method for retrieving data based on customizable retrieval settings, in accordance with an embodiment. Multiple search criteria may be stored in the electronic document and each search criteria may be directed for different uses. Thus, each search criterion may be retrieved differently depending on retrieval settings provided by a user. The retrieval settings can be stored in the electronic document and, as shown in FIG. 9, the retrieval settings are initially read from the electronic document in operation 950.

The retrieval settings specify the selection of one or more search criteria and can include operators such as comparison operators, mathematical logical operators, reference operators, conditions, and other operators associated with the selection of the search criteria. For example, the retrieval settings can assign a portion of the search criteria (or subsets of search criteria) to each user of the electronic document. In other words, one or more search criteria can be associated with an individual user. In another example, the retrieval settings can assign a portion of the search criteria to a date and time. Another exemplary retrieval setting can associate a portion of the search criteria to a location of the electronic document.

After the retrieval settings are read, a portion of the search criteria is selected in operation 952 based on the retrieval settings and, in operation 954, the data that matches the selected search criteria is retrieved. As a result, through the use of retrieval settings, a user can manipulate the selection of search criteria and the retrieval of data. For example, different portions of the search criteria may be selected for different users or readers of the electronic document. Thus, different data may be retrieved based on individual user preferences. Another example may include the selection of different portions of search criteria depending on when and where the electronic document is accessed. For instance, electronic document processing application can retrieve data associated with news in the morning and, during work hours, retrieve data associated with work.

After the data is retrieved, the contents associated with the electronic document are augmented with the retrieved data. As discussed above, augmentation includes adding the retrieved data to the original contents of the electronic document or updating a portion of the original contents. For example, videos that match a search criterion may be retrieved and added to the contents of an electronic document. In another example, a portion of alphanumeric text included in the original content may be updated or replaced with alphanumeric text retrieved from external sources.

Filtering

Figure 10:
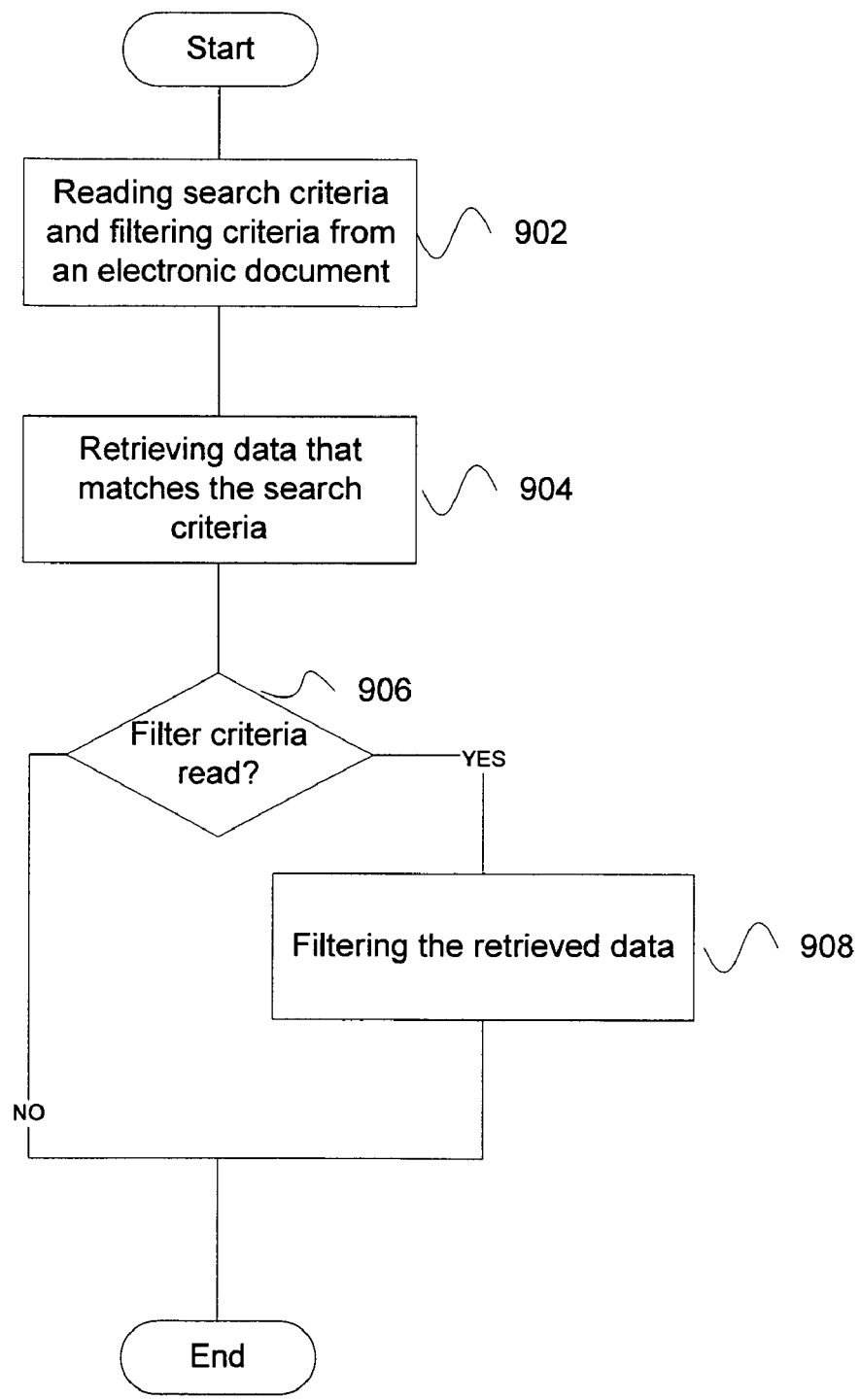
FIG. 10 is a flowchart diagram of an exemplary method for filtering data, in accordance with an embodiment.

FIG. 10 is a flowchart diagram of an exemplary method for filtering data, in accordance with an embodiment. As discussed above, one or more search criteria can be stored in an electronic document. Additionally, in an embodiment, one or more filtering criteria can also be stored in the electronic document. As shown in FIG. 10, search criteria and filtering criteria are read from the electronic document in operation 902. Filtering criteria may be a set of criteria used by the electronic document processing application to process the data. Exemplary filtering criteria can include field references, operators (e.g., comparison operators, mathematical logical operators, reference operators, conditions, and other operators), constants, and other filtering criteria. In an embodiment, an electronic document processing application may use the filtering criteria to reduce the data or contents rendered for output. For example, electronic document processing application may use filtering criteria to narrow down which data retrieved is most relevant. In another exemplary embodiment, electronic document processing application may use filtering criteria to sort the data by relevance.

After the search criteria and filtering criteria are read or extracted, as explained above, the data that matches the search criteria is retrieved in operation 904. Thereafter, in operation 906, a determination is made as to whether one or more filtering criteria are read from the electronic document. If filtering criteria are not read from or stored in the electronic document, then the data that matches the search criteria is not filtered. On the other hand, if filtering criteria is read, then the data that matches the search criteria is filtered in operation 908 based on the filtering criteria. An exemplary filtering operation 908 is to delete vulgar words from retrieved data of text. Another exemplary filtering operation 908 is to include product information of products that fall within a certain price range. Still another exemplary filtering operation 908 is to exclude information but for the first paragraph of a news article.

Data Transformation and Formatting

Figure 11:
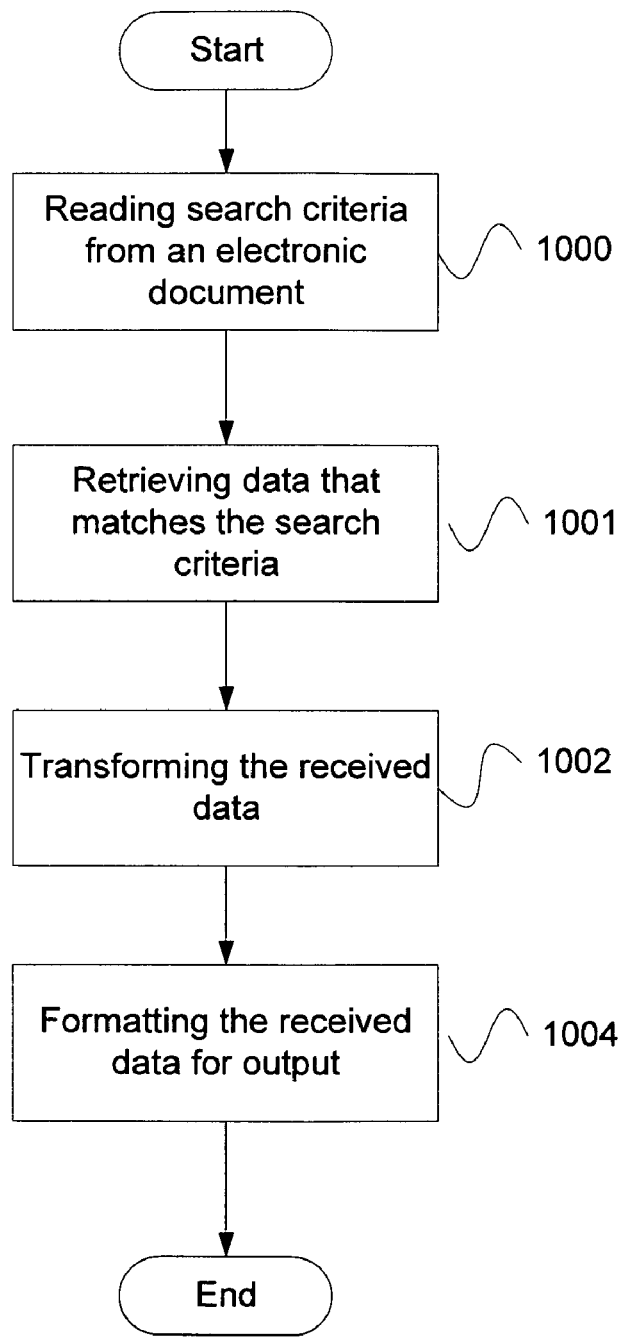
FIG. 11 is a flowchart diagram of an exemplary method for transforming and formatting the retrieved data, in accordance with an embodiment.

FIG. 11 is a flowchart diagram of an exemplary method for transforming and formatting the retrieved data, in accordance with an embodiment. As shown in FIG. 11, one or more search criteria are read from an electronic document in operation 1000 and data that matches the one or more search criteria is retrieved in operation 1001. After the data that matches the search criteria is retrieved, in an embodiment, the retrieved data may be transformed in operation 1002. For example, an optical character recognition (OCR) application may be included in the electronic document processing application to translate character images into machine-editable text. Electronic document processing application may additionally include voice recognition to translate digitized speech into machine-editable text. Another exemplary transformation operation 1002 is to translate words and sentences of one language into another language. Other exemplary transformation operations 1002 include transformation of data formats into other data formats (e.g., transform image from Graphics Interchange Format (GIF) to Joint Photographic Experts Group (JPEG) format), data encryption and/or decryption, and other transformation operations.

After the data is transformed in operation 1002, in an embodiment, the data may be formatted for output in operation 1004. The data can be formatted based on formatting information stored in the electronic document. For example, the electronic document may be formatted according to a pre-defined template. In another example, the data can be formatted based on formatting information attached to the data. For example, the retrieved data may be in an HTML format with embedded formatting information (e.g., Hypertext markup, structural markup, presentational markup, and other formatting information associated with HTML). Other exemplary formatting information include font type, font size, color, spacing, page size, and other format information that convey the design, layout, or styling of the retrieved data and/or electronic document.

In an embodiment, the formatting of the electronic document can adapt to the variable formatting associated with the retrieved data. For instance, as discussed above, different data may be retrieved depending on the retrieval settings, and the data may have different formats. Accordingly, the format of the electronic document can be made to accommodate the different formats. For example, sizes of text boxes, which are configured to display text, can be adjusted to accommodate the amount of text retrieved. Furthermore, in another embodiment, formatting of the electronic document can be dynamic. For example, the format of the electronic document can change with time, location, user preferences, and/or other parameters.

It should be noted that the above-described operations shown in FIG. 11 may be varied in implementation and the operations are not limited to the examples provided. For instance, transformation operation 1002 and formatting operation 1004 are optional. Therefore, in an embodiment, the data received in operation 1001 may be transformed in operation 1002 and/or formatted in operation 1004. In another embodiment, the data received in operation 1001 are neither transformed nor formatted.

In summary, the above-described embodiments provide augmentation of contents of an electronic document with data retrieved from a search. The use of search criteria to search for data allows data from multiple external sources to be augmented with the contents of the electronic document. As a result, the original contents of the electronic document are enhanced with the retrieved data. For instance, a user can view data retrieved from a variety of different sources on one electronic document. In other words, the results of multiple search queries can be integrated into one electronic document. Additionally, the ability to customize data retrieval and formatting allows dynamically changing and updated data to be displayed on the electronic document.

Although the foregoing examples have been described in some detail for purposes of clarity of understanding, the embodiments are not limited to the details provided. There are many alternative ways of implementing the embodiments. The disclosed examples are illustrative and not restrictive.

What is claimed is:

1. A method, comprising:
storing a plurality of search queries for an electronic document, wherein the plurality of search queries are stored as search queries distinct from other content in the electronic document;
storing retrieval settings for the electronic document, wherein the retrieval settings assign one or more of the search queries to a time or location; and
opening the electronic document via an electronic document processing application, wherein the electronic document processing application is separate from the electronic document, and wherein said opening causes the electronic document processing application to automatically perform:
accessing the retrieval settings;
selecting a particular search query from the plurality of search queries stored for the electronic document, wherein said selecting the particular search query depends on the retrieval settings and a time when or a location where the document is opened;
retrieving the particular search query;
submitting the particular search query to an Internet search engine;
receiving search results from the Internet search engine for data that match the particular search query retrieved for the electronic document, wherein the received search results are obtained via the Internet search engine by searching one or more sources external to the electronic document;
fetching data that matches the particular search query retrieved for the electronic document from the one or more sources, wherein said fetching is based on the received search results; and
augmenting a content of the electronic document using the fetched data that matches the particular search query retrieved for the electronic document.

2. The method of claim 1, further comprising formatting the fetched data for said augmenting.

3. The method of claim 1, further comprising filtering the data based on a filtering criterion, wherein the filtering criterion is stored in the electronic document.

4. The method of claim 1, wherein said submitting, said receiving, said fetching, and said augmenting are repeated periodically.

5. The method of claim 1, wherein said submitting, said receiving, said fetching, and said augmenting are repeated in response to a user input.

6. The method of claim 1, further comprising rendering the augmented content of the electronic document for output.

7. A computer program product embodied in a non-transitory computer readable storage medium storing computer instructions for:
opening an electronic document via an electronic document processing application, wherein the electronic document processing application is separate from the electronic document, and wherein said opening causes the electronic document processing application to automatically perform:
accessing retrieval settings for the electronic document;
extracting a plurality of search queries from a file associated with an electronic document, wherein the plurality of search queries are stored in the file as search queries distinct from other content of the electronic document, and wherein said extracting depends on the retrieval settings and a time when or a location where the document is opened, wherein the retrieval settings assign one or more of the search queries to a time or location;
submitting the extracted plurality of search queries to an Internet search engine;
receiving search results from the Internet search engine for data matching the extracted plurality of search queries, wherein the received search results are obtained via the Internet search engine by searching one or more sources external to the system;
retrieving a plurality of data external to the system, wherein the retrieved data match the plurality of search queries extracted from the file, wherein the retrieving is based on the received search results; and
augmenting a content of the electronic document using the retrieved plurality of data that match the plurality of search queries extracted from the file.

8. The computer program product of claim 7, wherein the computer instructions for retrieving the plurality of data that match the plurality of search queries comprise computer instructions for:
selecting a portion of the plurality of search queries; and
retrieving a portion of the plurality of data that match the portion of the plurality of search queries.

9. The computer program product of claim 8, wherein the computer instructions for selecting the portion of the plurality of search queries are based on a retrieval setting.

10. The computer program product of claim 7, further comprising computer instructions for filtering the plurality of data based on a filtering criterion to reduce the plurality of data rendered for output, the electronic document being configured to store the filtering criterion.

11. The computer program product of claim 7, wherein the computer instructions for retrieving the plurality of data that match the plurality of search queries comprise computer instructions for:
communicating the plurality of search queries to an application programming interface associated with the Internet search engine, the Internet search engine being configured to search for the plurality of data that match the plurality of search queries; and
receiving the plurality of data that match the plurality of search queries from the application programming interface associated with the Internet search engine.

12. The computer program product of claim 7, further comprising computer instructions for transforming the plurality of data that match the plurality of search queries.

13. The computer program product of claim 7, wherein the file associated with the electronic document is a single file.

14. A system, comprising:
a memory configured to store an electronic document processing application; and
a processor in communication with the memory, the processor being configured to execute the electronic document processing application stored in the memory, the electronic document processing application comprising program instructions for:
opening an electronic document, wherein the electronic document processing application is separate from the electronic document, and wherein said opening causes the electronic document processing application to automatically perform:
accessing retrieval settings for the electronic document;
reading a stored search query from an electronic document, wherein the stored search query is stored as a search query distinct from other content in the electronic document, and wherein said reading the stored search query depends on the retrieval settings and a time when or a location where the document is opened;
communicating the search query read from the electronic document to a search application, the search application being configured to:
search, over a network, one or more sources external to the system, for data that matches the search query read from the electronic document; and
fetch data that matches the search query read from the electronic document from the one or more sources external to the system;
receiving, from the search application, the fetched data that matches the search query read from the electronic document; and
augmenting a content of the electronic document with at least part of the received data that matches the search query read from the electronic document.

15. The system of claim 14, wherein the electronic document processing application further comprises program instructions for:
reading a filtering criterion from the electronic document, the electronic document being configured to store the filtering criterion; and
filtering the data based on the filtering criterion to reduce the data rendered for output.

16. The system of claim 14, wherein the stored search query is communicated to an application programming interface associated with the search application.

17. The system of claim 14, wherein the search application is configured to search for the data that matches the stored search query on an Internet.

18. The system of claim 14, wherein the search application is configured to search for the data that matches the stored search query on a database.

19. The system of claim 14, wherein the search application is configured to search for the data that matches the stored search query on a Web feed.

20. The system of claim 14, wherein the search application is configured to search for the data that matches the stored search query on a computer network.

21. A non-transitory computer readable storage medium storing:
an electronic document; and
an electronic document processing application that is separate from the electronic document, wherein the electronic document stores a search query configured for input into the electronic document processing application, wherein the search query is stored as a search query distinct from other content of the electronic document, and the electronic document processing application is configured to:
in response to the electronic document's being opened, access retrieval settings for the electronic document, wherein the retrieval settings assign one or more of the search queries to a time or location and based on a time or location of said opening, automatically:
search for data that matches the search query stored in the electronic document, wherein the matching data is located on one or more sources external to the electronic document; and
display both original content of the electronic document and the matching data retrieved from the one or more sources external to the electronic document, wherein the retrieved matching data is displayed in one or more regions of the display reserved for displaying content retrieved from the one or more sources external to the electronic document.

22. The non-transitory computer readable storage medium of claim 21, wherein the electronic document further stores a filtering criterion.

23. The non-transitory computer readable storage medium of claim 22, wherein the filtering criterion is configured for input into the electronic document processing application, the electronic document processing application being configured to reduce the data rendered for display based on the filtering criterion.

24. The method of claim 1, wherein said augmenting comprises replacing a portion of original contents of the electronic document with the fetched data.

25. The method of claim 1, wherein the one or more search queries comprise one or more of a keyword, a phrase, a question, a database query, a sentence, a number, and an equation.

* * * * *